United States Patent [19]

Carney et al.

[11] Patent Number: 5,684,100
[45] Date of Patent: Nov. 4, 1997

[54] CYCLOPENTADIENYL GROUP 6B METAL ALPHA-OLEFIN POLYMERIZATION CATALYSTS AND PROCESS FOR POLYMERIZING ALPHA-OLEFINS

[75] Inventors: Michael John Carney; David Lee Beach, both of Kingwood, Tex.

[73] Assignee: Chevron Chemical Company, San Ramon, Calif.

[21] Appl. No.: 432,040

[22] Filed: May 1, 1995

Related U.S. Application Data

[60] Division of Ser. No. 963,531, Oct. 20, 1992, Pat. No. 5,418,200, which is a continuation-in-part of Ser. No. 841,673, Feb. 26, 1992, abandoned, which is a continuation-in-part of Ser. No. 677,725, Mar. 29, 1991, abandoned.

[51] Int. Cl.$^6$ .................................................. C08F 4/42
[52] U.S. Cl. .......................... 526/160; 526/170; 526/943; 526/352; 502/117; 502/152
[58] Field of Search ........................... 526/160, 170, 526/943, 352

[56] References Cited

U.S. PATENT DOCUMENTS 5,418,200  5/1995  Carney et al. ..................... 502/117

*Primary Examiner*—Michael Lusignan
*Assistant Examiner*—Timothy H. Meeks
*Attorney, Agent, or Firm*—M. H. Michel; C. D. Holland

[57] ABSTRACT

Disclosed is a catalyst system for the homopolymerization and copolymerization of alpha-olefins having 2–8 carbon atoms, said catalyst system comprising a cyclopentadienyl Group 6b metal hydrocarbyl compound in which the metal has an oxidation state of +3, said Group 6b metal compound being supported on an inorganic support. The catalyst system my also contain a Group 2 or Group 3 metal alkyl compound.

29 Claims, No Drawings

CYCLOPENTADIENYL GROUP 6B METAL ALPHA-OLEFIN POLYMERIZATION CATALYSTS AND PROCESS FOR POLYMERIZING ALPHA-OLEFINS

This application is a divisional of application Ser. No. 07/963,531, filed Oct. 20, 1992, now U.S. Pat. No. 5,418,200, which in turn, is a continuation-in-part of application Ser. No. 07/841,673, filed Feb. 26, 1992 and now abandoned, which, in turn, is a continuation-in-part of application Ser. No. 07/677,725, filed Mar. 29, 1991 and now abandoned.

FIELD OF THE INVENTION

The present invention relates to catalyst systems for polymerizing alpha-olefins and processes for polymerizing alpha-olefins using such catalysts.

BACKGROUND OF THE INVENTION

Chromium based catalysts are used in the commercial polymerization of small alpha-olefins such as ethylene and propylene. One such catalyst is prepared by depositing chromocene (bis(cyclopentadienyl) chromium (II)) on an inorganic metal oxide support, as disclosed in British Patent No. 1,253,063 to Karapinka. U.S. Pat. No. 4,015,059, issued Mar. 29, 1977 to Karol, describes the use of bis(indenyl)- and bis(flourenyl)-chromium (II) compounds supported on activated inorganic oxide supports as catalysts for the polymerization of ethylene.

Recently, new synthetic methods have been described for preparing $Cr^{+3}$ organometallic compounds. Theopold, *J. Am. Chem, Soc.* (1988), 110, 5902 entitled "Cationic Chromium (III) Alkyls as Olefin Polymerization Catalysts", Theopold, *Acc. Chem. Res.* (1990), 23, 263 entitled "Organochromium (III) Chemistry: A Neglected Oxidation State" and Thomas et al., *J. Amer. Chem, Soc.*, 113 (1991), p. 893 et seq. disclose that certain pentamethylcyclopentadienyl chromium (III) alkyls can be prepared, and that they can be used for making polyethylene homogeneously in $CH_2Cl_2$. However, these homogeneous Cr (III) polymerization catalysts have several deficiencies. These include low polymer productivity, rapid deactivation, and the need to use polar, non-coordinating solvents. Additionally, since they are homogeneous catalysts, they are unsuitable for gas phase olefin polymerizations.

U.S. Pat. No. 4,530,914, issued Jul. 23, 1985 to Ewen et al., discloses a catalyst system for the polymerization of alpha-olefins which comprises two or more metallocenes, each having different propagation and termination rate constants, and aluminoxane. The metallocenes are cyclopentadienyl derivatives of a transition metal of Group 4b, 5b, and 6b metals of the Periodic Table. They are described by the formulas $(C_5R'_m)_pR''_s(C_5R'_m)MeQ_{3-p}$ and $R''_s(C_5R'_m)_2MeQ'$ where $(C_5R'_m)$ is a cyclopentadienyl or substituted cyclopentadienyl, each R' is hydrogen or a hydrocarbyl radical, R" is an alkylene radical, a dialkyl germanium or silicon or an alkyl phosphine or amine radical bridging two $(C_5R'_m)$ rings, Q is a hydrocarbon radical, Me is a Group 4b, 5b, or 6b metal, s is 0 or 1, p is 0, 1, or 2; when p=0, s=0; m is 4 when s is 1 and m is 5 when s is 0.

U.S. Pat. No. 4,939,217, issued Jul. 3, 1990 to Stricklen, also discloses a process for polymerizing olefins where the polymerization is conducted in the presence of hydrogen, and a catalyst system is used which contains aluminoxane and at least two metallocenes, each having different olefin polymerization termination rate constants. The metallocenes disclosed are similar to those described in aforementioned U.S. Pat. No. 4,530,914.

U.S. Pat. No. 4,975,403, issued Dec. 4, 1990 to Ewen, discloses a catalyst system for use in the polymerization of olefins. The catalyst system includes at least two different chiral, stereo-rigid metallocene catalysts of the formula $R''(C_5(R')_4)_2MeQ_p$ (where Me is a Group 4b, 5b or 6b metal and $(C_5(R')_4)$ is a cyclopentadienyl or substituted cyclopentadienyl ring) and an aluminum compound.

Canadian Patent Application No. 2,000,567, published Apr. 13, 1990, discloses a process for producing polyethylene using a composite catalyst made up of a solid catalyst component typified by a selected chromium compound, a modified aluminum compound typified by a trialkylaluminum, and an alkylaluminum alkoxide compound. The chromium compound may be chromium oxide, and the modified aluminum compound may be the reaction product of an organoaluminum compound and water.

It has now been discovered that when cyclopentadienyl Group 6b metal hydrocarbyl compounds, in which the Group 6b metal is in an oxidation state of +3, are supported on inorganic metal oxide or inorganic metal phosphate supports, high productivity alpha-olefin polymerization catalysts are produced, and that the use of a co-catalyst improves the productivity of many of these compounds.

SUMMARY OF THE INVENTION

In accordance with the present invention, there is provided a catalyst system for the homopolymerization and copolymerization of alpha-olefins having 2–8 carbon atoms, said catalyst system comprising a cyclopentadienyl Group 6b metal hydrocarbyl compound in which the metal has an oxidation state of +3, said Group 6b metal compound being supported on an inorganic support.

There is also provided in accordance with the present invention a catalyst system for the homopolymerization and copolymerization of alpha-olefins having 2–8 carbon atoms, said catalyst system comprising a cyclopentadienyl Group 6b metal hydrocarbyl compound in which the metal has an oxidation state of +3, said Group 6b metal compound being supported on an inorganic support, and a Group 2 or 3 metal alkyl compound.

Further provided in accordance with the present invention is a process for the homopolymerization or copolymerization of alpha-olefins having 2–8 carbon atoms comprising polymerizing said alpha-olefin, or copolymerizing two or more alpha-olefins in the presence of a catalyst system comprising a cyclopentadienyl Group 6b metal hydrocarbyl compound in which the metal has an oxidation state of +3, said group 6b metal compound being supported on an inorganic support.

The present invention also provides a process for the homopolymerization or copolymerization of alpha-olefins comprising polymerizing said alpha-olefin, or copolymerizing two or more alpha-olefins in the presence of a catalyst system comprising a cyclopentadienyl Group 6b metal hydrocarbyl compound in which the metal has an oxidation state of +3, said group 6b metal compound being supported on an inorganic support, and a Group 2 or 3 metal alkyl compound.

In the above catalyst systems and processes, chromium is a preferred Group 6b metal, silica, aluminum phosphate and alumina aluminum phosphate are preferred supports, and aluminoxanes and trialkylaluminum compounds are preferred Group 2 or 3 metal alkyl compounds.

DETAILED DESCRIPTION OF PREFERRED EMBODIMENTS

The present invention provides catalyst systems for use in the polymerization (either homopolymerization or copolymerization) of alpha-olefins, including ethylene, propylene, 1-butene, 1-hexene and 4-methyl-1-pentene.

It has quite surprisingly been found that, even though the productivity of many cyclopentadienyl Group 6b metal hydrocarbyl compounds is quite low when employed as catalyst in the homogeneous polymerization of alpha-olefins, when these compounds are supported on an inorganic metal oxide or inorganic phosphate solid support, their productivity increases dramatically, especially when co-catalysts are used. While the catalyst systems of the present invention can be used to polymerize a variety of alpha-olefins, they are especially useful in the polymerization of ethylene. These catalysts produce polyethylene in high yield, and the polymers produced have remarkably uniform particle size and highly desirable morphology (i.e., substantially spherical) that is suitable for gas phase polymerizations. The catalysts of the present invention allow the use of hydrogen during polymerization of polyethylene to reduce the molecular weight and to broaden the molecular weight distribution. In addition, the catalyst systems of this invention produce polyethylene with a variety of molecular weight distributions, depending on the support used.

A scanning electron micrograph (SEM) was produced at X10 magnification of a polyethylene sample produced by homogeneous polymerization using $[Cp*Cr(THF)_2CH_3]^+$ $[BPH_4]^-$ (where $Cp*$ represents pentamethylcyclopentadienyl, THF is tetrahydrofuran, and Ph is phenyl). This sample was characterized by very small, irregularly shaped particles. These particles were typically less than 20–50 μm (microns) in diameter. An SEM was taken at X10 magnification of a polyethylene sample produced by the method of the present invention using $Cp*Cr(CH_3)_2(THF)$ on a silica support. This sample had particles of much larger size (about 1 mm in diameter) than the homogeneous polymerization sample. The particle size was quite suitable for gas phasepolymerization applications. A third SEM was taken of a polyethylene sample produced by the method of this invention using $Cp*Cr(CH_3)_2(THF)$ on an $Al_2O_3 \cdot 2AlPO_4$ support. The particles were quite uniform in size, and primarily spherical in nature. Again, the particle size and spherical nature of the polymer makes this system attractive for gas phase polymerization applications.

Activities for the catalyst systems of the present invention are greater than 3,000 grams of polymer per gram of chromium metal per hour ("g/g Cr/hr"), preferably greater than 30,000 g/g Cr/hr, and more preferably greater than 200,000 g/g Cr/hr.

The term molecular weight distribution ("MWD"), as used herein, is the weight average molecular weight ("$M_w$") divided by the number average molecular weight ("$M_n$"), i.e., $M_w/M_n$. The polymers produced in accordance with the present invention using silica supported catalysts have a MWD greater than 10, preferably greater than 15, and more preferably greater than 20. These polymers, which have high MWD's, have improved ease of processing, better melt behavior, and other desirable properties such as impact resistance and environmental stress crack resistance. Large blow molded products are superior when made with high MWD polymers. Additionally, film is more puncture resistant when made from polymer with a high MWD. The polymers made in accordance with this invention using alumina aluminum phosphate supported catalysts possess high molecular weight and a more narrow MWD, making them useful in such applications as injection molding. Typically, the MWD for polymers made with alumina aluminum phosphate supported catalysts is less than 3.

The catalyst systems of the present invention comprise at least one cyclopentadienyl Group 6b metal hydrocarbyl compound in which the Group 6b metal is in an oxidation state of +3, and which is catalytically active when deposited on an inorganic metal oxide or inorganic metal phosphate support. As used herein, the term "cyclopentadienyl" refers to unsubstituted cyclopentadienyl as well as substituted derivatives of cyclopentadienyl in which the cyclopentadienyl ring contains one or more substituents which do not interfere with the Group 6b metal compound's ability to function as an alpha-olefin polymerization catalyst. Examples of substituted cyclopentadienyl include pentamethylcyclopentadienyl, methylcyclopentadienyl, t-butylcyclopentadienyl, and pentaphenylcyclopentadienyl, as well as compounds where the substituent forms a multicyclic ring with the cyclopentadienyl ring. Examples of these multi-cyclic rings include indenyl and fluorenyl rings. For the sake of simplicity, the abbreviation "Cp" will be used herein to refer to unsubstituted cyclopentadienyl, and the abbreviation "Cp*" will be used to refer to pentamethylcyclopentadienyl. Cp* is a preferred cyclopentadienyl group as it stabilizes the organometallic compound of this invention.

The Group 6b metal compounds useful in the present invention include compounds wherein the metal is chromium, molybdenum or tungsten. Compounds in which the metal is chromium are preferred. The Group 6b metal atom in the compound has an oxidation state of +3.

These Group 6b metal compounds have, in addition to one cyclopentadienyl group, at least one hydrocarbyl group bonded to the metal atom. As used herein, the term "hydrocarbyl" refers to alkyl, alkenyl, aryl, aralkyl and alkaryl radicals and the like. Exemplary hydrocarbyl radicals include, but are not limited to, methyl, ethyl, propyl, butyl, amyl, isoamyl, hexyl, neopentyl, isobutyl, heptyl, octyl, nonyl, decyl, cetyl, phenyl, benzyl and other similar groups. Additionally, organosilyl groups, such as trimethylsilyl methyl, i.e., $(CH_3)_3SiCH_2-$, and the like can be used. If more than one hydrocarbyl group is bonded to the metal atom, they can be independent or linked, i.e., they can form a 3-, 4-, 5-, 6-, or 7-membered metallocycle. Preferably, the hydrocarbyl group is sigma bonded to the Group 6b metal.

In addition to the cyclopentadienyl and hydrocarbyl groups, the Group 6b metal compounds of the present invention may also contain one or more sigma donor stabilizing ligands. These ligands contain an atom, such as oxygen, nitrogen, phosphorous or sulfur, which has a non-bonded electron pair. Examples of these ligands include, but are not limited to, ethers, amines, phosphines and thioethers. Ethers such as tetrahydrofuran (THF) and amines such as pyridine are preferred. Compounds with pyridine are most preferred and give catalysts with high activity and stability.

Examples of the Group 6b metal compounds useful in this invention include, but are not limited to, compounds having the following general formulas:

wherein M is a Group 6b metal such as chromium, molybdenum and tungsten;

$(C_5(R')_5)$ is a cyclopentadienyl or substituted cyclopentadienyl ring;

R' is at each independent occurrence hydrogen, a hydrocarbyl radical having 1–20 carbon atoms, or adjacent R' groups may together form one or more rings;

X is a hydrocarbyl radical having 1–20 carbon atoms (for example, a monovalent saturated aliphatic or alicyclic radical or a monovalent aromatic radical, or combinations thereof);

a=1 or 2, b=1 or 2 where a+b=3;

c=1 or 2 with the proviso that when c=2 then X is alkyl;

L is at each independent occurrence a sigma donor stabilizing ligand;

m=1 to 2 inclusive; and

A is an anion.

Examples of compounds having Formula (I) above include, but are not limited to, Cp*Cr(CH$_3$)$_2$(THF), Cp*Cr(Bzyl)$_2$(THF), Cp*Cr(Bzyl)$_2$(PYr), CP*Cr(CH$_3$)$_2$(PYr), CP*Cr(TMSM)$_2$(PYr), Cp*Cr(TMSM)$_2$, Cp*Cr(CH$_3$)$_2$ (DMAP), Cp*Cr(CH$_3$)$_2$ (PMe$_2$Ph), Cp*Cr(CH$_3$)$_2$(3,5-nutidine), and CpCr(CH$_3$)$_2$(DMAP), where Bzyl is benzyl, Pyr is pyridine, TMSM is trimethylsilylmethyl, DMAP is N,N-dimethylaminopyridine, and PMe$_2$Ph is dimethylphenylphosphine.

Further examples of the Group 6b compounds of this invention include monomeric Group 6b metal compounds, dimeric Group 6b metal compounds, and cationic Group 6b metal compounds. A preferred monomeric Group 6b metal compound is Cp*Cr(Bzyl)$_2$(THF), [Cp*Cr(CH$_3$)$_2$]$_2$ is a preferred dimeric compound, and a preferred cationic compound is [Cp*CrCH$_3$(THF)$_2$]$^+$[BPh$_4$]$^-$. Especially preferred compounds are Cp*Cr(CH$_3$)$_2$(pyr), Cp*Cr(CH$_3$)$_2$(3,5-Lutidine) and Cp*Cr(CH$_3$)$_2$(PMe$_2$Ph).

In part, the choice of Group 6b metal compound is based on the thermal stability of the compound and its ease of preparation. Of the Group 6b metal compounds useful in this invention, the organochromium compounds are preferred. Theopold, *J. Am. Chem. Soc.* (1988), 110, 5902 entitled "Cationic Chromium (III) Alkyls as Olefin Polymerization Catalysts", Theopold, *Acc. Chem. Res.* (1990), 23, 263 entitled "Organochromium (III) Chemistry: A Neglected Oxidation State", and Thomas et al., *J. Amer. Chem. Soc.*, 113 (1991), p. 893 et seq. (all of which are incorporated herein by reference) describe syntheses useful in making some of the Group 6b metal compounds of this invention. Similar procedures can be used to make related compounds.

In the catalyst systems of the present invention, the Group 6b metal compound is deposited on an inorganic support. Suitable inorganic metal oxide supports include silica, alumina, silica-alumina mixtures, thoria, zirconia, magnesium oxide and similar oxides. Suitable inorganic metal phosphates include aluminum phosphate, zirconium phosphate, magnesium-containing alumina phosphate and alumina aluminum phosphate. Silicas, aluminum phosphates and alumina aluminum phosphates. are preferred. Suitable silica supports include Davison 952, Davison 955, Crosfield EP-10 and Crosfield EP17MS. Further examples of useful supports are the following: alumina aluminum phosphates with aluminum to phosphorus ratios of about 5:1 to 1:1 as disclosed in U.S. Pat. Nos. 4,080,311 and 4,219,444; magnesia-alumina-aluminum phosphates as described in U.S. Pat. No. 4,210,560; zinc oxide-cadmium oxide-alumina-aluminum phosphates such as those disclosed in U.S. Pat. No. 4,367,067; and the calcium, barium, and/or strontium oxide-alumina-aluminum phosphates described in U.S. Pat. Nos. 4,382,877 and 4,382,878. The acidity of these supports can be adjusted by judicious inclusion of basic metals such as alkali and alkaline earth metals (Ca, Be, Mg, K, Li) to counteract excessive acidity. Other useful supports include magnesium halides, particularly magnesium chloride, such as those described in "Transition Metals and Organometallics as Catalysts for Olefin Polymerization" (1988, Springer-Verlag) edited by W. Kaminsky and H. Sinn and "Transition Metal Catalyzed Polymerizations-Ziegler-Natta and Metathesis Polymerizations" (1988, Cambridge University Press) edited by R. Quirk.

The supports useful in this invention should have a high surface area. In general, these supports should have the characteristics listed in the following table:

| Property | Broad Range | Preferred Range |
| --- | --- | --- |
| Surface area | 25–600 m$^2$/g | 100–370 m$^2$/g |
| Pore volume | 0.25–4 cm$^3$/g | 0.7–3 cm$^3$/g |
| Mean particle diameter | 30–200 microns | 60–140 microns |

Preferably, the pore size distribution is broad, with a significant percentage of the pores in the macropore range (>500 Angstroms). Preferably, at least 50% of the pores are macropores. It is also desirable that the support be substantially anhydrous before the Group 6b metal compound is deposited on it. Thus, it is desirable to calcine the support prior to deposition of the Group 6b metal compound.

The supported catalysts of this invention are readily prepared by techniques well known in the art. For example, a solution of the Group 6b metal compound in aliphatic, aromatic or cycloaliphatic hydrocarbons, or ethers such as diethyl ether or tetrahydrofuran can be stirred with the support until the Group 6b metal compound is adsorbed on or reacted with the support. The amount of Group 6b metal compound relative to the amount of support will vary considerably depending upon such factors as the particle size of the support, its pore size and surface area, the solubility of the Group 6b metal compound in the solvent employed, and the amount of Group 6b metal compound which is to be deposited on the support. However, in general the amount of Group 6b metal compound used is adjusted so that the final metal content (calculated as the element), relative to the support, is in the range of from about 0.01 to about 10 weight percent. In most cases, the most desirable level is in the range of about 0.1 to about 5 weight percent.

It has been found that the activity of many of the supported Group 6b metal compounds of this invention is significantly increased when they are employed in conjunction with a co-catalyst. The co-catalysts useful in the practice of the present invention are Group 2 and Group 3 metal alkyls. As used herein, the term "Group 2 and Group 3 metal alkyls" refers to compounds containing a metal from Group 2 or Group 3 of the Periodic Table (such as Mg, Zn, B, or Al) to which is bonded at least one alkyl group, preferably a C$_1$ to C$_8$ alkyl group. Suitable Group 2 and Group 3 metal alkyls include dialkyl magnesium, dialkyl zinc, trialkylboranes, and aluminum alkyls. Suitable aluminum alkyls include trialkylaluminums (such as trimethylaluminum, triethylaluminum, triisobutylaluminum and trioctylaluminum). Trialkylaluminums with alkyl groups of four carbons or greater are preferred. Other aluminum alkyls useful in the practice of the present invention include alkylaluminum alkoxides (such as diethylaluminum ethoxide and ethylaluminum diethoxide), and alkylaluminum halides (such as diethylaluminum chloride, diethylaluminum bromide, diethylaluminum iodide, diethylaluminum fluoride, ethyl aluminum dichloride, ethyl aluminum dibromide, ethyl aluminum diiodide, ethyl aluminum difluoride, and ethyl aluminum sesquichloride).

Other suitable aluminum alkyls are aluminoxanes, including those represented by the general formula (R—Al—O)$_n$ for the cyclic form and R(R—Al—O)$_n$—AlR$_2$ for the linear form. In these formulas, R is, at each independent occurrence, an alkyl group (such as methyl, butyl, isobutyl and the like) preferably with more than two carbon atoms, more preferably with 3–5 carbon atoms, and n is an integer, preferably from 1 to about 20. Most preferably, R is an isobutyl group. Mixtures of linear and cyclic aluminoxanes may also be used. Examples of aluminoxanes useful in this invention include, but are not limited to, ethyl aluminoxane, isobutyl aluminoxane, and methyl aluminoxane. Aluminoxanes (also known as "alumoxanes") suitable for use in this invention are described in Pasynkiewicz, "Alumoxanes: Synthesis, Structure, Complexes and Reactions," Polyhedron 9, p. 429 (1990), which is incorporated by reference herein in its entirety.

The preferred Group 2 and Group 3 metal alkyls are the aluminoxanes and the trialkylaluminums.

When used, the Group 2 and Group 3 metal alkyls are used in a Group 2 or 3 metal alkyl to Group 6b metal compound mole ratio of from about 1:1 to about 1000:1. The preferred mole ratio is from about 10:1 to about 200:1.

The catalyst systems of the present invention may be used in either slurry or gas phase polymerization processes. After the catalysts have been formed, the polymerization reaction is conducted by contacting the monomer charge with a catalytic amount of the catalyst at a temperature and at a pressure sufficient to initiate the polymerization reaction. If desired, an organic solvent may be used as a diluent and to facilitate materials handling. The polymerization reaction is carried out at temperatures of from about 30° C. or less up to about 200° C. or more, depending to a great extent on the operating pressure, the pressure of the entire monomer charge, the particular catalyst being used, and its concentration. Preferably, the temperature is from about 30° C. to about 125° C. The pressure can be any pressure sufficient to initiate the polymerization of the monomer charge, and can be from atmospheric up to about 1000 psig.

As a general rule, a pressure of about 20 to about 800 psig is preferred.

When the catalyst is used in a slurry-type process, an inert solvent medium is used. The solvent should be one which is inert to all other components and products of the reaction system, and be stable at the reaction conditions being used. It is not necessary, however, that the inert organic solvent medium also serve as a solvent for the polymer produced. The inert organic solvents which may be used include saturated aliphatic hydrocarbons (such as hexane, heptane, pentane, isopentane, isooctane, purified kerosene and the like), saturated cycloaliphatic hydrocarbons (such as cyclohexane, cyclopentane, dimethylcyclopentane, methylcyclopentane and the like), aromatic hydrocarbons (such as benzene, toluene, xylene and the like), and chlorinated hydrocarbons (such as chlorobenzene, tetrachloroethylene, o-dichlorobenzene and the like). Particularly preferred solvents are cyclohexane, pentane, isopentane, hexane and heptane.

When the catalyst is used in a gas phase process, it is suspended in a fluidized bed with, e.g., ethylene. Temperature, pressure and ethylene flow rates are adjusted so that to maintain acceptable fluidization of the catalyst particles and resultant polymer particles. Further descriptions of such a fluidized bed may be found in British Patent No. 1,253,063, to Karapinka, which is incorporated by reference herein.

The following examples are intended to further illustrate the present invention.

EXAMPLES

Example 1

Supports

Silica supports were purchased from W. R. Grace & Co., and included Davison 952 and Davison 955 silicas. These silicas have the following properties:

| Property | Davison 952 | Davison 955 |
|---|---|---|
| Surface area | 340 m²/g | 300 m²/g |
| Pore volume | 1.68 cm³/g | 1.60 cm³/g |
| Mean particle diameter | 110 microns | 40 microns |

Other silica supports were purchased from Crosfield Catalysts. These included EP-10, EP-11 and EP-12 supports. Some properties of the EP-10 support are:

| Property | Crosfield EP-10 |
|---|---|
| Surface area | 320 m²/g |
| Pore volume | 1.80 cm³/g |
| Mean particle diameter | 105 microns |

The $AlPO_4$ support was purchased from W. R. Grace & Co. The alumina aluminum phosphate supports used in the following examples were prepared by the procedure of Example 1 in U.S. Pat. No. 4,080,311, issued Mar. 21, 1978 to Kehl, which patent is incorporated by reference herein. The product had an $Al_2O_3$ to $AlPO_4$ ratio of 1:2.

CATALYST PREPARATIONS

In the preparation of the following catalysts, all manipulations were performed under argon using glove box or Schlenk techniques. All solvents were thoroughly dried over Na/benzophenone or calcium hydride and distilled prior to use.

Example 2

$[Cp*Cr(CH_3)_2]_2$

The organochromium compound $[CP*Cr(CH_3)_2]_2$ was prepared by the procedure described in Theopold, Acc. Chem. Res., 23 (1990), p. 264.

Example 3

Supported $[Cp*Cr(CH_3)_2]_2$

The organochromium compound $[Cp*Cr(CH_3)_2]_2$ (0.040 g, $9.2 \times 10^{-5}$ mole), prepared as described in Example 2, was dissolved in 10 ml of pentane, giving a dark brown solution to which was added Davison 952 silica (1.00 g). The resulting mixture was stirred for 15 minutes, giving a dark brown solid and a clear supernatant. The resulting solid catalyst was washed with pentane, and dried to a free-flowing powder.

Example 4

Supported $Cp*Cr(CH_3)_2(THF)$ $[Cp*Cr(CH_3)_2]_2$ (0.040 g, 9.2×10–5 mole) was added to 20 ml of tetrahydrofuran ("THF") and stirred for 0.5 hour, generating a green colored solution containing $Cp*Cr(CH_3)_2(THF)$. $Al_2O_3 \cdot 2AlPO_4$ (1.0 g) solid support was added all at once to this solution, and the resulting mixture was stirred for several minutes. All of the organochromium compound reacted with the solid support yielding a deep purple catalyst and a clear supernatant. The resulting catalyst slurry was filtered and the purple solid was washed twice with 10 ml of THF and dried under vacuum to a free flowing powder.

Example 5

$[Cp*CrCH_3(THF)_2]^+[BPh_4]^-$

This compound was prepared by the method described in Thomas et al., J. Amer. Chem. Soc., 113 (1990), p. 900.

Preparation No. 13, method B was used to prepare compound number 14 in that paper, i.e., [Cp*CrCH$_3$(THF)$_2$]$^+$ [BPh$_4$]$^-$.

Example 6

Supported [Cp*CrCH$_3$(THF)$_2$]$^+$[BPh$_4$]$^-$

[Cp*CrCH$_3$(THF)$_2$]$^+$[BPh$_4$]$^-$ (0.075 g, 1.1×10$^{-4}$ mole) was dissolved in 20 ml of THF and treated all at once with 1.00 g of Al2O$_3$. 2AlPO$_4$. The resulting mixture was stirred for 15 minutes resulting in a dark blue solid and a clear supernatant. The solid was washed with THF, and dried to a free-flowing powder.

Comparative Example A

Ethylene Polymerization using an Unsupported Catalyst 90.1 micromoles of [Cp*CrCH$_3$(THF)$_2$]$^+$[BPh$_4$]$^-$ was dissolved in 25 ml methylene chloride in a 50 ml Fischer-Porter bottle, and pressured to 50 psig with ethylene. The reactor was stirred at 25° C. for 1.0 hour. Initially, the ethylene uptake was rapid, but this rate decreased rapidly over the first half hour. The reaction was stopped by-venting the pressure. The polymer produced was washed with isopropanol and then with acetone. The polymer was then dried under vacuum. The results of this polymerization are indicated in Run 1 in Tables I and II.

Comparative Example B

Ethylene Polymerization Using An Unsupported Catalyst and A Co-Catalyst

The procedure of Comparative Example A was repeated, except that 71 molar equivalents of isobutyl aluminoxane (IBAO) was added to the reaction vessel prior to pressurization with ethylene. The results of this polymerization are indicated in Run 2 in Tables I and II.

Example 7

Ethylene Polymerization

Polymerization runs were conducted in 1 or 2 liter autoclave reactors under particle form (slurry) conditions using between 300 and 500 ml heptane as diluent, and a weighed amount of catalyst (typically 0.050 to 0.250 g). Run times of 0.5 to 1.0 hour were normally employed. For example, in a typical run, 0.100 g of the catalyst prepared in Example 4 (Cp*Cr(CH$_3$)$_2$(THF) adsorbed on Al$_2$O$_3$.2AlPO$_4$) was charged to a one-liter autoclave along with 300 ml of heptane. Polyisobutylaluminoxane (0.5 ml of a 1.0M heptane solution, prepared by slow hydrolysis of triisobutylaluminumwith 1.0 equivalents of H$_2$O as in Example 3 of U.S. Pat. No. 4,665,208, issued May 12, 1987 to Welborn et al., which patent is incorporated by reference herein) was added to the stirred reactor as co-catalyst. The reactor temperature and pressure were adjusted to 85° C. and 550 psi (with ethylene), respectively. The ethylene was supplied on demand from a pressurized reservoir. After 0.5 hour, the reaction was stopped by rapidly cooling the reactor and venting the pressure. The polymer produced was washed with isopropanol and acetone, and dried under vacuum to yield 82.9 g Of white, granular solid. The results of this polymerization are indicated in Run 15 in Tables III and IV.

Polymerization runs similar to that described above were conducted using the catalysts and conditions shown in Tables I, III, and V below. Analytical data for the polyethylenes produced in these runs is shown in Tables II, IV and VI below. All molecular weights in these tables were determined by gel permeation chromatography.

Example 8

Gas Phase Polymerization

The procedure of Example 7 is repeated in a 2 liter, stirred autoclave using the supported Cr$^{+3}$ catalysts described above, except that heptane is not added to the autoclave. The reactor temperature and pressure are adjusted to 85° C. and 550 psi (with ethylene), respectively. A white, granular polymer is produced.

TABLE I

POLYMERIZATION DATA FOR [Cp*CrMe(THF)$_2$] [BPh$_4$]

| Run | Support[a] | μmol Cr | Cocatalyst | Al:Cr[b] | C$_2$H$_4$, psig | Temp. °C. | Activity[c] | Activity[g] |
|---|---|---|---|---|---|---|---|---|
| 1 | none[d] | 90.1 | — | 0 | 50 | 25 | 510 | 40 |
| 2 | none[d] | 90.1 | IBAO[e] | 71:1 | 50 | 25 | 89 | 7 |
| 3 | Davison 952 Silica | 28.2 | IBAO | 71:1 | 50 | 25 | 6,690[f] | 72 |
| 4 | Davison 952 Silica | 21.6 | — | 0 | 550 | 80 | 0 | 0 |
| 5 | Davison 952 Silica | 27.0 | IBAO | 110:1 | 550 | 80 | 48,400 | 523 |
| 6 | Davison 952 Silica | 27.0 | IBAO | 71:1 | 550 | 85 | 50,600 | 546 |
| 7 | Davison 952 Silica | 27.0 | Al(CH$_3$)$_3$ | 71:1 | 550 | 85 | 3,700 | 40 |
| 8 | Al$_2$O$_3$.2AlPO$_4$ | 15.0 | IBAO | 33:1 | 550 | 85 | 233,000 | 2516 |

[a]Precalcined at 400° C. for 48 hours.
[b]Mole ratio.
[c]g polymer/g Cr/hr.
[d]Performed under homogeneous conditions in CH$_2$Cl$_2$, catalyst rapidly deactivated.
[e]IBAO = isobutylaluminoxane.
[f]Polymerization performed tor two hours.
[g]g polymer/g catalyst/hr.

TABLE II

ANALYTICAL DATA FOR POLYETHYLENES PREPARED WITH [Cp*CrMe(THF)$_2$] [BPh$_4$]

| Run | Support[g] | $T_m$, °C. | Density g/cc | Mean Particle Diameter, Microns | $M_w$[h] $\times 10^{-3}$ | MWD |
|---|---|---|---|---|---|---|
| 1 | —[i] | 135.5 | — | — | 125 | 5.8 |
| 5 | Davison 952 Silica | 138.8 | — | 830 | 252 | 12.8 |
| 6 | Davison 952 Silica | 137.9 | 0.942 | 850 | 258 | 22.6 |
| 7 | Davison 952 Silica | 136.3 | — | — | 236 | 34.2 |
| 8 | Al$_2$O$_3$.2AlPO$_4$ | 138.0 | 0.927 | — | 919 | 4.41 |

[g]Precalcined at 400° C. for 48 hours.
[h]Determined by GPC.
[i]Performed under homogeneous conditions in CH$_2$Cl$_2$.

TABLE III

POLYMERIZATION DATA FOR SUPPORTED Cp*CrMe$_2$ (THF)

| Run | Support[k] | µmol Cr | Co-catalyst | Al:Cr[l] | C$_2$H$_4$, psig | Temp. °C. | Activity[m] | Activity[p] |
|---|---|---|---|---|---|---|---|---|
| 9 | Davison 952 Silica | 46.0 | — | 0 | 550 | 80 | 0 | 0 |
| 10 | Davison 952 Silica | 46.0 | EAO[n] | 44:1 | 550 | 80 | 15,200 | 164 |
| 11 | Davison 952 Silica | 46.0 | IBAO[o] | 44:1 | 550 | 85 | 33,000 | 356 |
| 12 | Davison 955 Silica | 46.0 | IBAO | 44:1 | 550 | 85 | 51,000 | 551 |
| 13 | Davison 955 Silica | 18.4 | IBAO | 54:1 | 550 | 85 | 55,900 | 604 |
| 14 | Al$_2$O$_3$.2AlPO$_4$ | 46.0 | — | 0 | 550 | 85 | 5,400 | 58 |
| 15 | Al$_2$O$_3$.2AlPO$_4$ | 18.4 | IBAO | 27:1 | 550 | 85 | 173,000 | 1868 |
| 16 | Al$_2$O$_3$.2AlPO$_4$ | 18.4 | IBAO | 54:1 | 550 | 65 | 272,000 | 2938 |
| 17 | Al$_2$O$_3$.2AlPO$_4$ | 18.4 | IBAO | 27:1 | 550 | 65 | 169,000 | 1825 |
| 18 | Al$_2$O$_3$.2AlPO$_4$ | 18.4 | IBAO | 27:1 | 550 | 85 | 240,000 | 2592 |

[k]Precalcined at 400° C. for 48 hours.
[l]Mole ratio.
[m]g polymer/g Cr/hr.
[n]EAO = ethylaluminoxane.
[o]IBAO = isobutylaluminoxane.
[p]polymer/g catalyst/hr.

TABLE IV

ANALYTICAL DATA FOR POLYETHYLENES PREPARED WITH SUPPORTED Cp*CrMe$_2$ (THF)

| Run | Support[p] | $T_m$, °C. | Density g/cc | $M_w$[q] $\times 10^{-3}$ | MWD |
|---|---|---|---|---|---|
| 10 | Davison 952 Silica | 138.4 | 0.941 | 306 | 18.2 |
| 11 | Davison 952 Silica | 139.6 | — | 293 | 19.2 |
| 12 | Davison 955 Silica | 138.3 | — | 301 | 20.4 |
| 13 | Davison 955 Silica | 138.3 | 0.941 | 270 | 14.4 |
| 14 | Al$_2$O$_3$.2AlPO$_4$ | 135.1 | — | 805 | 2.68 |
| 15 | Al$_2$O$_3$.2AlPO$_4$ | 134.7 | — | 790 | 2.63 |
| 16 | Al2O$_3$.2AlPO$_4$ | 136.6 | 0.927 | 1130 | 2.75 |
| 17 | Al$_2$O$_3$.2AlPO$_4$ | 139.0 | 0.924 | 917 | 4.13 |
| 18 | Al$_2$O$_3$.2AlPO$_4$ | 138.1 | 0.926 | 1134 | 5.61 |

[p]Calcined at 400° C. for 48 hours.
[q]Determined by GPC.

TABLE V

POLYMERIZATION DATA FOR SUPPORTED [Cp*CrMe$_2$]$_2$

| Run | Support[a] | µmol Cr | Co-cat | Al:Cr[t] | C$_2$H$_4$, psig | Temp. °C. | Activity[u] | Activity[v] |
|---|---|---|---|---|---|---|---|---|
| 19 | Davison 952 Silica | 76.7 | — | 0 | 550 | 85 | 15,200 | 164 |
| 20 | Davison 955 Silica | 74.8 | — | 0 | 550 | 85 | 16,000 | 173 |
| 21 | Al$_2$O$_3$.2AlPO$_4$ | 57.5 | — | 0 | 550 | 85 | 2,900 | 31 |

[a]Calcined at 400° C. for 48 hours.
[t]Mole ratio.
[u]g polymer/g Cr/hr.
[v]g polymer/g catalyst/hr.

TABLE VI

ANALYTICAL DATA FOR POLYETHYLENES PREPARED WITH SUPPORTED [Cp*CrMe$_2$]$_2$

| Run | Support[y] | T$_m$, °C. | Density g/cc | Mean Particle Diameter, Microns | Mw[w] × 10$^{-3}$ | MWD |
|---|---|---|---|---|---|---|
| 19 | Davison 952 Silica | 139.3 | — | 910 | 252 | 23.5 |
| 20 | Davison 955 Silica | 140.6 | — | — | 347 | 14.7 |
| 21 | Al$_2$O$_3$.2AlPO$_4$ | 138.3 | — | — | — | — |

[y]Calcined at 400° C. for 48 hours.
[w]Determined by GPC.

Looking at Tables I and II, it can be seen that the polymerization using the homogeneous cationic Cr$^{+3}$ compound has low activity (Run 1), and that adding triisobutyl-aluminoxane does not improve the activity, but rather reduces it (Run 2). These runs were performed at 25° C. so as to avoid decomposition of the thermally labile homogeneous catalyst.

In contrast, Run 3 shows an approximately ten-fold improvement in activity using a supported catalyst system of this invention.

Runs 4–8 show the need for a co-catalyst when using this cationic Cr$^{+3}$ compound. The aluminoxane co-catalyst gives improved activity over the trimethylaluminum co-catalyst. Additionally, higher molecular weights (M$_w$) and higher molecular weight distributions (MWD=M$_w$/M$_n$) are obtained with the catalyst system of the present invention (see Table II). The activity of this catalyst system was highest when the support was an alumina aluminum phosphate support, and the polymer had higher molecular weight as well.

Looking at Tables III and IV, a co-catalyst appears to be necessary with the silica support and is advantageous with the alumina aluminum phosphate support. Using the aluminoxane with the longer alkyl groups (isobutyl vs. ethyl) gives higher activities. Also, the Davison 955 silica, which has a substantially smaller average particle size than the Davison 952 silica, gives higher activity (compare Runs 10 and 11 with Runs 12 and 13).

Table III also shows that the catalyst systems of this invention perform exceptionally well over the temperature range of 65–°85° C.

Looking at Tables V and VI, the catalyst system of this invention based on [Cp*Cr(CH$_3$)$_2$]$_2$ dimer is also quite active, and gives polymers with very attractive high molecular weights and broad (high) MWD's.

Example 9

Cp*Cr(TMSM)$_2$ 1,318 g of CrCl$_3$(THF)$_3$ was placed in a 100 ml Schlenk flask along with a stirring bar and about 50–60 ml of THF. 0.500 g of Cp*Li was added to the resulting slurry producing a blue solution ([Cp*CrCl$_2$]$_2$). This solution was allowed to stir for at least three hours (preferably overnight). To the stirring solution was slowly added 2 equivalents of LiCH$_2$Si (CH$_3$)$_3$. The solution changed from blue to purple.

The THF was then removed by roloevaporation and the resulting solid was dissolved in pentane yielding a red brown solution which was filtered to remove LiCl. The pentane was removed by rotoevaporation and the solid was redissolved in a minimum amount of pentane and crystallized at −30° C. Yield 50–60%.

It is important to note that this compound is thermally unstable and decomposes at room temperature liberating tetramethylsilane.

Example 10

Supported Cp*Cr(TMSM)$_2$

Cp*Cr(TMSM)$_2$ (0.075 g) was dissolved in 10 ml of pentane. Al$_2$O$_3$. 2AlPO$_4$ (1.00 g) was added all at once to the stirred solution resulting in the formation of a purple solid and clear supernatant after 15 minutes. The solid was collected, washed twice with pentane, and dried in vacuo to a free-flowing powder.

Example 11

The supported Cp*Cr(TMSM)$_2$ prepared in Example 10 was used to polymerize ethylene by a procedure similar to that described in Example 7, except that the polymerization was performed at 80° C.–85° C. and 550 psi total pressure (ethylene and hydrogen). The results of these polymerization runs are indicated in Table VII below, and analytical data for the polyethylenes produced are indicated in Table VIII below.

TABLE VII

POLYMERIZATION DATA FOR SUPPORTED Cp*Cr(TMSM)$_2$

| Run[1] | µ mol | Co | Al:Cr[2] | H$_2$ (psi) | Temp °C. | Activity[3] | Activity[7] |
|---|---|---|---|---|---|---|---|
| 22 | 31 | None | 0 | 0 | 80 | 2,500 | 27 |
| 23 | 16 | IBAO[4] | 16:1 | 0 | 80 | 250,000 | 2700 |

TABLE VII-continued

POLYMERIZATION DATA FOR SUPPORTED Cp*Cr(TMSM)$_2$

| Run[1] | μ mol | Co | Al:Cr[2] | H$_2$ (psi) | Temp °C. | Activity[3] | Activity[7] |
|---|---|---|---|---|---|---|---|
| 24 | 16 | IBAO | 32:1 | 0 | 80 | 341,000 | 3680 |
| 25 | 16 | IBAO | 32:1 | 0 | 80 | 372,000 | 4010 |
| 26 | 16 | IBAO | 19:1 | 0 | 80 | 248,000 | 2670 |
| 27 | 16 | IBAO | 19:1 | 0 | 80 | 230,000 | 2480 |
| 28 | 16 | IBAO | 32:1 | 10 | 80 | 294,000 | 3170 |
| 29 | 16 | IBAO | 32:1 | 25 | 80 | 340,000 | 3660 |
| 30 | 16 | IBAO | 32:1 | 25 | 80 | 227,000 | 2450 |
| 31 | 16 | IBAO | 32:1 | 50 | 80 | 227,000 | 2452 |
| 32 | 16 | IBAO | 32:1 | 50 | 80 | 249,000 | 2689 |
| 33 | 16 | IBAO | 32:1 | 100 | 80 | 194,000 | 2091 |
| 34 | 16 | IBAO | 32:1 | 200 | 80 | 124,000 | 1339 |
| 35 | 16 | TEB[5] | 32:1[6] | 0 | 80 | ~0 | 0 |

[1]Support dehydrated at 400° C. for 48 hours for all runs.
[2]Mole ratio.
[3]Expressed as g polymer/g Cr/hr.
[4]IBAO is isobutylaluminoxane.
[5]TEB is triethylboron.
[6]B:Cr mole ratio.
[7]Expressed as g polymer/g catalyst/hr.
All polymerizations performed at 550 psi total pressure (ethylene plus hydrogen).

TABLE VIII

ANALYTICAL DATA FOR POLYETHYLENES PREPARED WITH SUPPORTED Cp*Cr(TMSM)$_2$

| Run[10] | T$_m$, °C. | MI[7] | HLMI[8] | Mw[9] × 10$^{-3}$ | MWD |
|---|---|---|---|---|---|
| 23 | 139.1 | 0 | 0 | 1,124 | 2.02 |
| 24 | 139.4 | 0 | 0 | 891 | 7.61 |
| 25 | 136.3 | — | — | 1,075 | 2.72 |
| 26 | 138.1 | — | — | 901 | 2.71 |
| 27 | 137.6 | — | — | 824 | 2.42 |
| 28 | 139.9 | 0 | 0 | — | — |
| 29 | 139.9 | 0 | 2.27 | 330 | 9.29 |
| 30 | 141.9 | 0 | 2.03 | 276 | 8.52 |
| 31 | 139.7 | 0 | 6.50 | 228 | 9.62 |
| 32 | 138.8 | 0 | 11.9 | 205.6 | 9.40 |
| 33 | 138.0 | 2.12 | 12.7 | 116.3 | 8.37 |
| 34 | 135.0 | High | High | 55.8 | 10.50 |

[7]Melt Index (ASTM D-1238, Condition E)
[8]High load melt index (ASTM D-1238, Condition F)
[9]Determined by GPC.
[10]Support dehydrated at 400° C. for 48 hours for all runs.

Example 12

Cp*Cr(Bzyl)$_2$(THF)

To a slurry of CrCl$_3$(THF)$_3$ (2.00 g, 5.33 moles) in 50 ml of THF was added LiCp* (0.76 g, 5.34 moles) slowly with stirring to yield a deep blue solution. This solution was stirred for two hours. Slow addition of benzyl magnesium chloride (5.3 ml of 2.0M solution) resulted in a deep purple solution after complete addition. Solvent was subsequently removed under vacuum to yield a sticky purple residue. Pentane (200 ml) was added and stirred overnight. The pentate solution slowly became green-brown during this time. The pentane solution was filtered to remove metal halides, concentrated to ca. 75 ml and stored at −40° C. overnight. The crystalline material that formed was collected, washed with cold pentate, and dried under vacuum, affording 680 mg (29%) of dark brown material.

Comparative Example 13

Homogeneous Polymerization with Cp*Cr(Bzyl)$_2$ (THF)

Seventy-five milligrams of Cp*Cr(CH$_2$Ph)$_2$(THF) was dissolved in 50 ml of heptane and placed in a thick-walled glass vessel which was attached to a purified ethylene supply. Ethylene was added to 50 psi at ca. 20° C. A mild exotherm ensued with the generation of 0.70 g of beige polymer after one hour. The catalyst was essentially inactive after one hour as evidenced by the lack of ethylene uptake.

Example 14

Cp*Cr(Bzyl)$_2$(THF) was supported on Al$_2$O$_3$.2AlPO$_4$ (which had been dehydrated at 400° C. for 48 hours) and used to polymerize ethylene using the procedure described in Example 11. The results of these polymerization runs are indicated in Tables IX and X below.

TABLE IX

POLYMERIZATION DATA FOR Cp*Cr(Bzyl)$_2$(THF)

| Run | μ mol Cr | Cocatalyst | Al:Cr[10] | C$_2$H$_4$ (psi) | Temp (°C.) | Activity[11] | Activity[13] |
|---|---|---|---|---|---|---|---|
| 36 | 12 | IBAO | 25:1 | 550 | 80 | 444,000 | 3900 |
| 37[12] | 12 | IBAO | 25:1 | 550 | 80 | 235,000 | 1940 |
| 38[12] | 12 | IBAO | 25:1 | 550 | 80 | 230,000 | 1900 |
| 39[15] | 12 | IBAO | 25:1 | 550 | 80 | 613,000 | 5000 |
| 40[12,15] | 12 | IBAO | 25:1 | 300 | 80 | 236,000 | 1940 |
| 41 | 158 | ? | 0 | 50 | 80 | 720 | 85[14] |

[10]Mole ratio.
[11]Expressed as g polymer/g Cr/hr.
[12]Polymerization performed with argon/ethylene mixture (250 psi/300 psi).
[13]Expressed as g polymer/g catalyst/hr.
[14]Data tor unsupported catalyst per Example 13.
[15]Supported catalyst. Al$_2$O$_3$.2AlPO$_4$ dehydrated at 400° C. for 48 hours.

TABLE X

ANALYTICAL DATA FOR POLYETHYLENES PREPARED WITH Cp*Cr(Bzyl)$_2$(THF)

| Run | $T_m$, C. | Density | $M^a_w \times 10^{-3}$ | MWD |
|---|---|---|---|---|
| 39 | 135.7 | 0.9288 | 1,243 | 1.75 |
| 40 | 135.4 | 0.9325 | 881 | 3.13 |
| 41 | — | — | 22.6 | 2.34[b] |

[a]Determined by GPC.
[b]Data for homogeneous polymerization of unsupported catalyst per Example 13.

Example 15

Cp*Cr(CH$_3$)$_2$(Pyr)

This compound was prepared following the general description contained in Noh, S. K.; Sendlinger, S. C.; Janiak, C.; Theopold, K. H. *J. Am. Chem Soc.* (1989), 111, 9127. Lithium cyclopentadienide (0.380 g, 2.67 mmol) was added slowly to a slurry of 1.00 g (2.67 mmol) of CrCl$_3$ (THF)$_3$ in 50 mL of THF. The resulting blue solution was stirred for 2 hours. Pyridine (0.222 g, 2.80 mmol) was added resulting in the deposition of a light blue solid. Stirring was continued for 1 hour after which was added (dropwise) 2.0 equivalents (3.80 mL of 1.4M solution in Et20) of methyllithium. The dark green-brown solution was stirred an additional 0.5 hr and then taken to dryness under vacuum. The dark solid was extracted into pentane, filtered to remove metal halides, and taken dryness. The remaining solid was reextracted into pentane, filtered, and the solvent was reduced until microcrystals appeared. The dark brown solution was kept at –40° C. overnight resulting in the depositon of black crystals. The crystals were collected and dried under vacuum.

Example 16

Cp*Cr(Bzyl)$_2$(Pyr)

This compound was prepared as in Example 15 except that two equivalents of benzylmagnesium bromide were substituted for methyllithium. A microcrystalline solid formed and was dried under vacuum. Anal. Calc. for C$_{29}$H$_{34}$NCr: C,77.65; H,7.64; N,3.12. Found: C,77.03; H,7.48; N,2.80.

Example 17

Cp*Cr(TMSM)$_2$(Pyr)

This compound was prepared as in Example 15 except that two equivalents of trimethylsilylmethyllithium solution were added in place of methyllithium. Long, black needles formed after cooling to –40 ° C. overnight. These were collected and dried to yield 1.30 g (55%) of pure material. Anal. Calc. for C$_{23}$H$_{42}$NSi$_2$Cr: C, 62.67; H, 9.60; N, 3.17. Found: C, 62.36; H, 9.46; N, 2.84.

Example 18

CP*Cr(CH$_3$)$_2$(DMAP)

This compound was prepared as described in Example 15 except that 1.05 equivalents of N,N-dimethylaminopyridine (DMAP) were added instead of pyridine. Large, dark brown crystals were collected and dried under vacuum (710 mg, 78% yield). Anal. Calc. (Found) for C$_{19}$H$_{31}$N$_2$Cr: C, 67.22 (66.69); H, 9.20 (9.01); N, 8.25 (7.73).

Example 19

CpCr(CH$_3$)$_2$(DMAP)

This compound was prepared as described in Example 15 except that 1.0 equivalent of a 1.0M solution of sodium cyclopentadienide in the THF was added in place of lithium pentamethycyclopentadienide. Dark brown microcrystals were obtained in 67% overall yield (485 mg). Anal. Calc. (Found) for C$_{14}$H$_{21}$N$_2$Cr: C, 62.43 (62.12); H, 7.88 (7.87); N, 10.40 (10.42).

Example 20

Cp*Cr(CH$_3$)$_2$(PMe$_2$Ph)

This compound was prepared as described in Example 15 except that 1.05 equivalents of dimethylphenylphosphine (PMe$_2$Ph) were added instead of pyridine. Large blue/purple crystals were obtained in 56% overall yield (530 mg). Anal. Calc. (Found) for C$_{20}$H$_{32}$PCr: C, 67.58 (67.14); H, 9.07 (8.96); N, 0.0 (0.12)

Example 21

CpCr(CH$_3$)$_2$(PMe$_2$Ph)

This material was prepared according to Example 20 except that 1.0 equivalents of sodium cyclopentadienide was added in place of lithium pentamethylcyclpentadienide. Long blue/purple needles were obtained in 59% yield (453 mg). Anal. Calc. (Found) for C$_{15}$H$_{22}$PCr: c, 63.15 (62.33); H, 7.77 (7.59); N, 0.0 (0.0).

Example 22

Cp*Cr(CH$_3$)(3,5-Lutidine)

Prepared as in Example 15 above except that 1.05 equivalents of 3,5-lutidine were added in place of pyridine. Dark microcrystals (510 mg, 59%) were collected and dried.

Example 23

CpCr(CH$_3$)$_2$(Pyr)

Prepared as described in Example 15 above except that 1.0 equivalent of sodium cyclopentadienide was added instead of lithium pentamethylcyclopentadienide.

Example 24

Supported Complexes

Cp*Cr(CH$_3$)$_2$(Pyr), Cp*Cr(Bzyl)$_2$(Pyr), Cp*Cr(TMSM)$_2$ (Pyr), Cp*CrMe$_2$ (DMAP), CpCrMe$_2$ (DMAP), Cp*CrMe$_2$ (PMe$_2$Ph), CpCrMe$_2$ ( PMe$_2$Ph), Cp*CrMe$_2$ (3,5-Lutidine), and CpCrMe$_2$ (Pyr) were individually supported on dehydrated (400° C.) supports as in Example 10 to give catalysts with ca 1.0 wt % chromium. The supports used are listed in the following tables.

Example 25

The supported catalysts of Example 24 were each in turn used to polymerize ethylene by a procedure similar to that described in Example 11. The results of these polymerization runs are indicated in the following tables.

All molecular weight distributions were determined using liquid size exclusion (gel permeation) chromatography. The columns were Polymer Labs Inc. PLgel 20 μm Mixed-a columns. The solvent used was 1,2,4-trichlorobenzene at a temperature of 150° C.

All supports were dehydrated prior to use in order to provide increased polymerization activity. Specific dehydration temperatures and conditions are noted in the tables.

TABLE XI

Polymerization Data for Cp*Cr(CH$_3$)$_2$(Pyr)$^d$

| Run # | Support$^a$ | µmol Cr | Co-cat | Al:Cr$^b$ | Temp °C. | P(C$_2$H$_4$) | P(H$_2$) | Activity$^c$ | Activity$^j$ |
|---|---|---|---|---|---|---|---|---|---|
| 42 | Al$_2$O$_3$.2AlPO$_4$ | 15.7 | IBAO$^e$ | 19 | 80 | 550 | 0 | 623,000 | 6700 |
| 43 | Al$_2$O$_3$.2AlPO$_4$ | 15.7 | IBAO | 19 | 80 | 550 | 0 | 237,000 | 2500$^f$ |
| 44 | Al$_2$O$_3$.2AlPO$_4$ | 8.4 | IBAO | 24 | 80 | 550 | 0 | 764,000 | 8250 |
| 45 | AlPO$_4$ | 8.4 | IBAO | 24 | 80 | 550 | 0 | 1,488,000 | 16,070 |
| 46 | AlPO$_4$ | 8.4 | IBAO | 24 | 80 | 550 | 0 | 1,600,000 | 17,280 |
| 47 | AlPO$_4$ | 10.5 | IBAO | 29 | 80 | 200 | 0 | 437,000 | 4720 |
| 48 | AlPO$_4$ | 10.5 | IBAO | 29 | 80 | 194 | 6 | 487,000 | 5260 |
| 49 | AlPO$_4$ | 10.5 | IBAO | 29 | 80 | 188 | 12 | 515,000 | 5560 |
| 50 | AlPO$_4$ | 10.5 | IBAO | 29 | 80 | 167 | 33 | 365,000 | 3940 |
| 51 | AlPO$_4$ | 10.5 | IBAO | 29 | 80 | 280 | 20 | 735,000 | 7940 |
| 52 | AlPO$_4$ | 10.5 | IBAO | 29 | 80 | 300 | 0 | 695,370 | 7510 |
| 53 | AlPO$_4$ | 10.5 | IBAO | 29 | 80 | 200 | 0 | 361,111 | 3900 |
| 54 | EP-10$^g$ | 16.7 | IBAO | 18 | 80 | 550 | 0 | 410,000 | 4428 |
| 55 | EP-10$^g$ | 15.7 | IBAO | 19 | 80 | 550 | 0 | 356,000 | 3845 |
| 56 | EP-10$^g$ | 10.5 | IBAO | 19 | 80 | 250 | 0 | 262,963 | 2840 |
| 57 | EP-10$^g$ | 10.5 | IBAO | 29 | 80 | 250 | 0 | 355,556 | 3840 |
| 58 | Ep-10$^i$ | 10.5 | IBAO | 29 | 80 | 250 | 0 | 401,852 | 4340 |
| 59 | EP-11$^g$ | 10.5 | IBAO | 29 | 80 | 250 | 0 | 322,222 | 3480 |
| 60 | EP-12$^g$ | 10.5 | IBAO | 29 | 80 | 250 | 0 | 322,222 | 3480 |

$^a$Support dehydrated at 400° C. for 24 hrs. for all runs unless indicated otherwise.
$^b$Mole ratio.
$^c$Expressed as g polymer/g Cr/hr.
$^d$Pyr = pyridine.
$^e$IBAO = isobutyl aluminoxane.
$^f$Polymerization performed with 300 psi/250 psi ethylene/argon ratio
$^g$Crosfield silica support (similar to Davison 952) -dehydrated at 600° C. for 24 hrs.
$^i$Dehydrated at 800° C. rather than 600° C. for 24 hrs.
$^j$Expressed as g polymer/g catalyst/hr.

TABLE XII

ANALYTICAL DATA FOR POLYETHYLENES PREPARED WITH SUPPORTED Cp*CrMe$_2$(pyr) CATALYSTS OF TABLE X

| Run # | T$_m$, °C. | MI$^a$ | HLMI$^b$ | Density g/cc | Mw$^c$ × 10$^{-3}$ | MWD |
|---|---|---|---|---|---|---|
| 42 | 137.0 | 0 | 0 | 0.9318 | 1026 | 2.52 |
| 43 | 138.8 | 0 | 0 | 0.9318 | 879 | 2.90 |
| 44 | 139.6 | 0 | 0 | 0.9284 | 886 | 2.13 |
| 45 | 139.3 | 0 | 0 | 0.9297 | 962 | 2.38 |
| 46 | 136.1 | — | — | 0.9306 | 844 | 2.33 |
| 47 | 137.0 | 0 | 0 | 0.9297 | 840 | 2.73 |
| 48 | — | 0 | 3.46 | — | 360 | 6.01 |
| 49 | — | 0 | 14.08 | — | 274 | 5.33 |
| 50 | — | 1.61 | High | — | 129 | 7.44 |
| 51 | — | 0 | 7.84 | 0.9552 | 267 | 10.76 |
| 52 | 135.9 | — | — | — | 676 | 2.77 |
| 53 | 135.8 | — | — | 0.9307 | 796 | 2.61 |
| 54 | 137.1 | 0 | 0 | 0.9492 | 956 | 4.24 |
| 55 | 136.4 | 0 | 0 | 0.9387 | 606 | 39.9 |
| 56 | 136.5 | — | — | 0.9362 | 615 | 7.20 |
| 57 | 139.6 | — | — | 0.9423 | 722 | 5.59 |
| 58 | 137.3 | — | — | 0.9397 | 794 | 3.98 |
| 59 | 136.7 | — | — | 0.9398 | 810 | 4.24 |
| 60 | 136.9 | — | — | 0.9414 | 830 | 7.51 |

$^a$Melt Index (ASTM D-1238, Condition E).
$^b$High Load Melt Index (ASTM D-1238, Condition F).
$^c$Determined by GPC.

TABLE XIII

POLYMERIZATION DATA FOR SELECTED CHROMIUM COMPOUNDS

| Run # | Support$^a$ | Cr Compound | µmol Cr | Co-catalyst | Al:Cr$^b$ | P(C$_2$H$_4$) | Temp °C. | Activity$^c$ | Activity$^d$ |
|---|---|---|---|---|---|---|---|---|---|
| 61 | Al$_2$O$_3$.2AlPO$_4$ | Cp*Cr(Bzyl)$_2$(Pyr)$^e$ | 12.8 | IBAO | 24 | 550 | 80 | 750,000 | 8100 |
| 62 | Al$_2$O$_3$.2AlPO$_4$ | Cp*Cr(Bzyl)$_2$(Pyr)$^e$ | 8.4 | IBAO | 36 | 550 | 80 | 794,000 | 6900 |
| 63 | Al$_2$O$_3$.2AlPO$_4$ | Cp*Cr(Bzyl)$_2$(Pyr)$^e$ | 10.1 | IBAO | 20 | 550 | 80 | 370,000 | 3200 |
| 64 | Al$_2$O$_3$.2AlPO$_4$ | Cp*Cr(TMSM)$_2$(Pyr)$^f$ | 12.8 | IBAO | 24 | 550 | 80 | 722,000 | 7798 |
| 65 | Al$_2$O$_3$.2AlPO$_4$ | Cp*Cr(TMSM)$_2$(Pyr)$^f$ | 14.0 | IBAO | 22 | 550 | 80 | 722,000 | 6640 |
| 66 | Al$_2$O$_3$.2AlPO$_4$ | Cp*Cr(CH$_3$)$_2$(DMAP)$^g$ | 8.2 | IBAO | 24 | 550 | 80 | 317,000 | 3425 |

TABLE XIII-continued

POLYMERIZATION DATA FOR SELECTED CHROMIUM COMPOUNDS

| Run # | Support[a] | Cr Compound | μmol Cr | Co-catalyst | Al:Cr[b] | P(C₂H₄) | Temp °C. | Activity[c] | Activity[d] |
|---|---|---|---|---|---|---|---|---|---|
| 67 | AlPO₄ | Cp*Cr(CH₃)₂(DMAP)[g] | 10.3 | IBAO | 29 | 550 | 80 | 401,800 | 4340 |
| 68 | AlPO₄ | Cp*Cr(CH₃)₂(DMAP)[g] | 10.3 | IBAO | 29 | 200 | 80 | 168,500 | 1820 |
| 69 | AlPO₄ | Cp*Cr(CH₃)₂(PMe₂Ph)[h] | 10.1 | IBAO | 30 | 550 | 80 | 1,229,000 | 13,270 |
| 70 | AlPO₄ | Cp*Cr(CH₃)₂(PMe₂Ph)[h] | 10.1 | IBAO | 30 | 200 | 80 | 346,000 | 3740 |
| 71 | AlPO₄ | Cp*Cr(CH₃)₂(3,5-lutidine) | 9.6 | IBAO | 31 | 200 | 80 | 320,000 | 3460 |
| 72 | AlPO₄ | CpCr(CH₃)₂(PMe₂Ph) | 10.5 | IBAO | 29 | 550 | 80 | 454,000 | 4900 |
| 73 | AlPO₄ | CpCr(CH₃)₂(DMAP) | 10.8 | IBAO | 28 | 550 | 80 | 82,400 | 890 |
| 74 | AlPO₄ | CpCr(CH₃)₂(DMAP) | 10.8 | IBAO | 28 | 200 | 80 | 39,400 | 426 |
| 75 | Al₂O₃·2AlPO₄ | CpCr(CH₃)₂(pyr) | 14.9 | IBAO | 20 | 550 | 80 | 194,000 | 2100 |

[a]Dehydrated under dry argon at 400° C. for 24 hrs.
[b]IBAO = isobutyaluminoxane, mole ratio Al:Cr.
[c]Pressure in psi.
[d]Expressed as g polymer/g Cr/hr.
[e]Bzyl - benzyl; Pry - pyridine
[f]TMSM = trimethylsilylmethyl
[g]DMAP = N,N-dimethylaminopyridine
[h]PMe₂Ph = dimethylphenylphosphine
[i]Expressed as g polymer/g catalyst/hr.

TABLE XIV

ANALYTICAL DATA FOR POLYETHYLENES PREPARED WITH SUPPORTED CATALYSTS OF TABLE XII.

| Run | Tm, °C. | MI[a] | HLMI[b] | Density g/cc | Mw[c] × 10⁻³ | MWD |
|---|---|---|---|---|---|---|
| 61 | 139.6 | 0 | 0 | 0.9281 | 1,013 | 2.80 |
| 63 | 141.4 | — | — | 0.9280 | 1,414 | 1.72 |
| 64 | 137.6 | 0 | 0 | 0.9288 | 1,017 | 2.90 |
| 66 | 236.8 | — | — | 0.9288 | 921 | 2.15 |
| 67 | 136.7 | — | — | 0.9302 | 801 | 2.11 |
| 68 | 135.6 | — | — | 0.9290 | 847 | 3.04 |
| 69 | 137.2 | — | — | — | 850 | 3.20 |
| 70 | 137.6 | — | — | — | 934 | 3.14 |
| 71 | 135.5 | — | — | 0.9315 | 956 | 3.76 |
| 72 | 13S.8 | — | — | 0.9301 | 882 | 2.83 |
| 73 | 137.5 | — | — | 0.9309 | 1,002 | 2.73 |
| 74 | 134.7 | — | — | — | 983 | 3.41 |
| 75 | 137.2 | 0 | 0 | 0.9294 | 740 | 2.82 |

[a]Melt index (ASTM D-1238, Condition E).
[b]High load melt index (ASTM D-1238, Condition F).

What is claimed is:

1. A process for the homopolymerization or copolymerization of alpha-olefins having 2–8 carbon atoms comprising polymerizing said alpha-olefin, or copolymerizing two or more alpha-olefins in the presence of a catalyst system comprising a cyclopentadienyl chromium hydrocarbyl compound in which the chromium has an oxidation state of +3, said chromium compound being supported on an inorganic support.

2. The process of claim 1 wherein the hydrocarbyl is sigma bonded to the chromium.

3. The process of claim 1 wherein the chromium compound has the formula:

$$(C_5(R')_5)_a CrX_b(L) \quad \text{(I)}$$

$$[(C_5(R')_5)_a CrX_b]_c \quad \text{(II) or}$$

$$[(C_5(R')_5)_a CrX_b(L)_m]^+[A]^- \quad \text{(III)}$$

wherein $(C_5(R')_5)$ is a cyclopentadienyl or substituted cyclopentadienyl ring;

R' is at each independent occurrence hydrogen, a hydrocarbyl radical having 1–20 carbon atoms, or adjacent R' groups may together form one or more rings;

X is a hydrocarbyl radical having 1–20 carbon atoms;

a=1 or 2, b=1 or 2 where a+b=3;

c=1 or 2 with the proviso that when c=2 then X is alkyl;

L is at each independent occurrence a sigma donor stabilizing ligand;

m=1 to 2 inclusive; and

A is an anion.

4. The process of claim 3 wherein the chromium compound is selected from

Cp*Cr(CH₃)₂(THF)
[Cp*Cr(CH₃)₂]₂
[Cp*Cr(THF)₂CH₃]+[BPh₄]⁻
Cp*Cr(Bzyl)₂(THF)
Cp*Cr(TMSM)₂
Cp*Cr(CH₃)₂(Pyr)
Cp*Cr(TMSM)₂(Pyr)
Cp*Cr(Bzyl)₂(Pyr)
Cp*Cr(CH₃)₂(DMAP)
Cp*Cr(CH₃)₂(PMe₂Ph)
Cp*Cr(CH₃)₂(3,5-lutidine)
CpCr(CH₃)₂(Pyr)
CpCr(CH₃)₃(PMe₂Ph)
CpCr(CH₃)₂(DMAP)

where Cp* is pentamethylcyclopentadienyl, THF is tetrahydrofuran, Ph is phenyl, Bzyl is benzyl, TMSM is trimethylsilylmethyl, Pyr is pyridine, DMAP is N,N-dimethylaminopyridine, PMe₂Ph is dimethylphenylphosphine, and Cp is unsubstituted cyclopentadienyl.

5. The process of claim 4 wherein the support is selected from the group consisting of alumina, silica, silica-alumina, aluminum phosphate, zirconium phosphate, and alumina aluminum phosphate.

6. The process of claim 5 wherein the support is selected from silica, aluminum phosphate and alumina aluminum phosphate.

7. The process of claim 6 wherein the support is alumina aluminum phosphate.

8. The process of claim 1 wherein the support is an inorganic metal oxide or inorganic metal phosphate.

9. The process of claim 1 wherein the support is selected from the group consisting of alumina, silica, silica-alumina, aluminum phosphate, zirconium phosphate, and alumina aluminum phosphate.

10. The process of claim 9 wherein the support is selected from silica, aluminum phosphate and alumina aluminum phosphate.

11. The process of claim 10 wherein the support is alumina aluminum phosphate.

12. A process for the homopolymerization or copolymerization of alpha-olefins comprising polymerizing said alpha-olefin, or copolymerizing two or more alpha-olefins in the presence of a catalyst system comprising a cyclopentadienyl chromimum hydrocarbyl compound in which the chromium has an oxidation state of +3, said chromium compound being supported on an inorganic support, and a Group 2 or 3 metal alkyl compound.

13. The process of claim 12 wherein the hydrocarbyl is sigma bonded to the chromium.

14. The process of claim 12 wherein the chromium compound has the formula:

$$(C_5(R')_5)_a CrX_b(L) \qquad (I)$$

$$[(C_5(R')_5)_a CrX_b]_c \qquad (II) \text{ or}$$

$$[(C_5(R')_5)_a CrX_b(L)_m]^+[A]^- \qquad (III)$$

wherein $(C_5(R')_5)$ is a cyclopentadienyl or substituted cyclopentadienyl ring;

R' is at each independent occurrence hydrogen, a hydrocarbyl radical having 1–20 carbon atoms, or adjacent R' groups may together form one or more rings;

X is a hydrocarbyl radical having 1–20 carbon atoms;

a=1 or 2, b=1 or 2 where a+b=3;

c=1 or 2 with the proviso that when c=2 then X is alkyl;

L is at each independent occurrence a sigma donor stabilizing ligand;

m=1 to 2 inclusive; and

A is an anion.

15. The process of claim 14 wherein the chromium compound is selected from

Cp*Cr(CH$_3$)$_2$(THF)

[Cp*Cr(CH$_3$)$_2$]$_2$

[Cp*Cr(THF)$_2$CH$_3$]+[BPh$_4$]$^-$

Cp*Cr(Bzyl)$_2$(THF)

Cp*Cr(TMSM)$_2$

Cp*Cr(CH$_3$)$_2$(Pyr)

Cp*Cr(TMSM)$_2$(Pyr)

Cp*Cr(Bzyl)$_2$(Pyr)

Cp*Cr(CH$_3$)$_2$(DMAP)

Cp*Cr(CH$_3$)$_2$(PMe$_2$Ph)

Cp*Cr(CH$_3$)$_2$(3,5-lutidine)

CpCr(CH$_3$)$_2$(Pyr)

CpCr(CH$_3$)$_3$(PMe$_2$Ph)

CpCr(CH$_3$)$_2$(DMAP)

where Cp* is pentamethylcyclopentadienyl, THF is tetrahydrofuran, Ph is phenyl, Bzyl is benzyl, TMSM is trimethylsilylmethyl, Pyr is pyridine, DMAP is N,N-dimethylaminopyridine, PMe$_2$Ph is dimethylphenylphosphine, and Cp is unsubstituted cyclopentadienyl.

16. The process of claim 12 wherein the support is an inorganic metal oxide or inorganic metal phosphate.

17. The process of claim 16 wherein the support is selected from the group consisting of alumina, silica, silica-alumina, aluminum phosphate, zirconium phosphate, and alumina aluminum phosphate.

18. The process of claim 17 wherein the support is selected from silica, aluminum phosphate and alumina aluminum phosphate.

19. The process of claim 18 wherein the support is alumina aluminum phosphate.

20. The process of claim 12 wherein the Group 2 or Group 3 metal alkyl compound is an alkylaluminum compound.

21. The process of claim 20 wherein the alkylaluminum compound is selected from the group consisting of trialkylaluminum compounds, alkylaluminum alkoxides, alkylaluminum halides and aluminoxanes.

22. The process of claim 21 wherein the alkylaluminum compound is an aluminoxane or trialkylaluminum compound.

23. The process of claim 12 wherein the chromium compound is selected from

Cp*Cr(CH$_3$)$_2$(THF)

[Cp*Cr(CH$_3$)$_2$]$_2$

[Cp*Cr(THF)$_2$CH$_3$]+[Bph$_4$]$^-$

Cp*Cr(Bzyl)$_2$(THF) or

Cp*Cr(TMSM)$_2$,

Cp*Cr(CH$_3$)$_2$(Pyr)

Cp*Cr(TMSM)$_2$(Pyr)

Cp*Cr(Bzyl)$_2$(Pyr)

Cp*Cr(CH$_3$)$_2$(DMAP)

Cp*Cr(CH$_3$)$_2$(PMe$_2$Ph)

Cp*Cr(CH$_3$)$_2$(3,5-lutidine)

CpCr(CH$_3$)$_2$(Pyr)

CpCr(CH$_3$)$_3$(PMe$_2$Ph)

CpCr(CH$_3$)$_2$(DMAP)

the support is selected from the group consisting of alumina, silica, silica-alumina, aluminum phosphate, zirconium phosphate, and alumina aluminum phosphate, and the Group 2 or 3 metal alkyl compound is an alkylaluminum compound.

24. The process of claim 23 wherein the support is selected from silica, aluminum phosphate and alumina aluminum phosphate.

25. The process of claim 24 wherein the support is alumina aluminum phosphate.

26. The process of claim 23 wherein the alkylaluminum compound is selected from the group, consisting of trialkylaluminum compounds, alkylaluminum alkoxides, alkylaluminum halides and aluminoxanes.

27. The process of claim 26 wherein the alkylaluminum compound is an aluminoxane or trialkylaluminum compound.

28. The process of claim 23 wherein the chromium compound is selected from

Cp*Cr(CH$_3$)$_2$(THF)

[Cp*Cr(CH$_3$)$_2$]$_2$

[Cp*Cr(THF)$_2$CH$_3$]+[BPh$_4$]$^-$

Cp*Cr(Bzyl)$_2$(THF)

Cp*Cr(TMSM)$_2$
Cp*Cr(CH$_3$)$_2$(Pyr)
Cp*Cr(TMSM)$_2$(Pyr) and
Cp*Cr(Bzyl)$_2$(Pyr)
Cp*Cr(CH$_3$)$_2$(DMAP)
Cp*Cr(CH$_3$)$_2$(PMe$_2$Ph)
Cp*Cr(CH$_3$)$_2$(3,5-lutidine)
CpCr(CH$_3$)$_2$(Pyr)
CpCr(CH$_3$)$_3$(PMe$_2$Ph)
CpCr(CH$_3$)$_2$(DMAP)

the support is silica or alumina aluminum phosphate, and the alkylaluminum compound is an aluminoxane or a trialkylaluminum compound.

29. The process of claim 28 wherein the support is alumina aluminum phosphate.

* * * * *